United States Patent [19]

Kaijima et al.

[11] Patent Number: 4,912,071
[45] Date of Patent: Mar. 27, 1990

[54] METHOD OF UNLOADING CATALYST

[75] Inventors: Toyoo Kaijima; Tomiyasu Hirachi; Katsuhiko Kawakami; Junichi Takano, all of Tokyo, Japan

[73] Assignees: Kashima Engineering Co., Ltd., Chiyoda; Softard Industries Co., Ltd., Kodaira, both of Japan

[21] Appl. No.: 113,522

[22] Filed: Oct. 28, 1987

[30] Foreign Application Priority Data

Jul. 10, 1987 [JP] Japan .................................. 62-172641

[51] Int. Cl.$^4$ .......................... B01J 38/66; B01J 38/56; B01J 27/30; C10G 45/08
[52] U.S. Cl. ................................ 502/26; 208/216 R; 502/31
[58] Field of Search ............. 208/216 R, 217; 502/31, 502/26, 301

[56] References Cited

U.S. PATENT DOCUMENTS

| 3,256,353 | 6/1966 | Shuman, Jr. et al. | 585/264 |
| 3,772,211 | 11/1973 | Mounce | 502/31 |
| 4,031,031 | 6/1977 | Yamaguchi et al. | 502/26 |
| 4,062,801 | 12/1977 | Burton et al. | 502/31 |
| 4,155,875 | 5/1979 | Yamaguchi et al. | 208/213 |
| 4,268,414 | 5/1981 | Kawakami et al. | 208/216 R |
| 4,576,712 | 3/1986 | Greenwood | 208/DIG. 1 |

FOREIGN PATENT DOCUMENTS

| 50-140369 | 11/1975 | Japan | 208/213 |
| 52-50033 | 12/1977 | Japan | 208/213 |

Primary Examiner—Paul E. Konopka
Attorney, Agent, or Firm—Millen, White & Zelano

[57] ABSTRACT

The present invention relates to a method of unloading a catalyst from a reactor wherein the reactor is filled with mixed liquid of condensed ring aromatic hydrocarbon having a required number of ring members, i.e. preferably 2 to 4 ring members, and gas oil, to wet the catalyst so as to form a coating of film on the catalyst before unloading the catalyst from the reactor.

16 Claims, 2 Drawing Sheets

METHOD OF UNLOADING CATALYST

BACKGROUND OF THE INVENTION

1. Field of the Invention

This invention relates to a method of unloading a so-called used catalyst or the like deteriorated in activity from columns and vessels such as a hydro-desulfurizing reaction column, hereinafter referred to as "reactor", in a chemical plant such as a petroleum refining plant.

2. Description of the Prior Art

In general, various catalysts are used in reactors in chemical plants and the like. It is necessary to unload these catalysts from the reactor because of decreased activity caused by poisoning due to accumulated coke, which can result in the catalyst metal and the like, being broken to pieces due to decreased mechanical strength, repair and inspection of equipment.

The time required to unload the catalyst unloading work is needed to make as short as possible in order to minimize the period of down time of the plant operation. Furthermore, many catalysts are used under a reducing atmosphere. When the catalyst is exposed to the atmosphere for unloading the catalyst, therefore, there is a possibility of combustion and the like by heat due to oxidation of coke, sulphur and the like accumulated on the catalyst during its use. Moreover, a proper unloading procedure should be performed while avoiding the adverse influence to the human bodies by $SO_x$ generated by the combustion, the adverse influence to the human bodies by dust of the catalyst, and the like.

In relatively small-sized reactor, in unloading a catalyst, the catalyst is first completely burned and regenerated by use of steam and air in the reactor and a thereafter, the catalyst is unloaded. However, according to this method, because burning and regenerating of the catalyst are performed in the reactor, it takes a long period of time to regenerate the catalyst, thus raising the regenerating cost, and, expenses associated with controlling the pollution caused by $SO_x$ due to regeneration of the catalyst and so on. In large-sized reactors, in order to avoid combustion and the like due to oxidation of the catalyst, nitrogen gas is fed into the reactor and the catalyst is unloaded under this nitrogen gas atmosphere, or the catalyst is wetted with gas oil and unloaded during shut-down of the operation without being oxidized.

However, in the method of unloading the catalyst under the nitrogen gas atmosphere, it is technically difficult to shut off air completely during the catalyst unloading procedure and the catalyst is heated slowly and oxidizes with time due to flowout and the like of air from an air line mask worn by a worker. Moreover, the temperature in the reactor is greatly raised during the catalyst unloading technique, the environment becomes deteriorated due to generation of gas such as $SO_x$ and dust, there is a possibility of combustion. Hence, this method need not necessarily be the satisfactory method of unloading the catalyst. Where attempts have been made, for example using the method of wetting the catalyst with gas oil and unloading the same, to make the gas oil pervade whose surface of the catalyst the results have not been satisfacory in that a complete coating film over the surface of the catalyst has not been obtained.

SUMMARY OF THE INVENTION

In veiw of the fact that, during the unloading of the catalyst from the reactor, the catalyst has a high temperature at the time when the operation of the reactor is stopped, while the catalyst has low temperature when the catalyst is actually unloaded, the inventor of the present invention has found that the materal having a high change in viscosity due to temperature should be used thereby achieving the present invention.

An object of the present invention is to provide a method of unloading a catalyst, wherein a catalyst is prevented from being oxidized, poisoning of the unloading of the catalyst can be avoided and catalyst can be safely and efficiently performed.

To this end, the present invention contemplates that, in a method of unloading a catalyst stored in a reactor used in a chemical plant, a mixed liquid of condensed ring aromatic hydrocarbons having a suitable number of ring members, high in change of viscosity due to temperature and not containing more than a very small value of organic amine and gas oil is used, the mixed liquid is made to pervade the outer surface and inner-pores of the catalyst at a predetermined temperature in the reactor during a shut-down in operation thereof, and the catalyst is unloaded such that a coating film is formed on the catalyst by the mixed liquid at the predetermined temperature in the reactor during unloading of the catalyst.

As to the number of ring members of the condensed ring aromatic hydrocarbons, 2 or more is used, and preferably 2 to 4. Naphthalenes such as alkylnaphthalene, is a representative example of a two-member ring condensed hydrocarbon; anthracenes such as alkylanthracene is a representative example of a three-member ring condensed hydrocarbon; and pyrenes, such as allylpyrene, is a representative example of a four-membered ring hydrocarbon suitable for purposes of the present invention.

As to the viscosity temperature gradient, the mixed liquid should have a low viscosity at the time of high temperature and a high viscosity at the time of low temperature is used. In additionl, the mixed liquid should only include a very small content of organic amine, i.e., less than 0.005 weight percent. The temperature in the reactor when the operation is stopped is within the range of 200° C. to 150° C. and preferably 180° C., and the temperature in the reactor during unloading of the catalyst is within the range of 70° C. to ambient temperature, and preferably 50° C. or less.

The mixed liquid of the condensed ring aromatic hydrocarbon and gas oil is introduced into the reactor in accordance with the present invention after a feedstock such as heavy oil, is drawn off from the reactor. At the temperature in the reactor at this time, the mixed liquid thus introduced, because of its low viscosity, pervades the whole surface of the catalyst and wets the inner-pores of the catalyst. As the temperature in the reactor lowers with time, the viscosity of the mixed liquid infiltrating into the catalyst gradually increases and forms a strong film coating the surface of the catalyst. The catalyst coated with the film of mixed liquid is thus prevented from being oxidized and is protected against a possibility of combustion and the like, so that the catalyst can be unloaded safely and efficiently.

DETAILED DESCRIPTION OF THE PREFERRED EMBODIMENT

One embodiment of the present invention will hereunder be described with the accompanying drawings.

Figure 1:
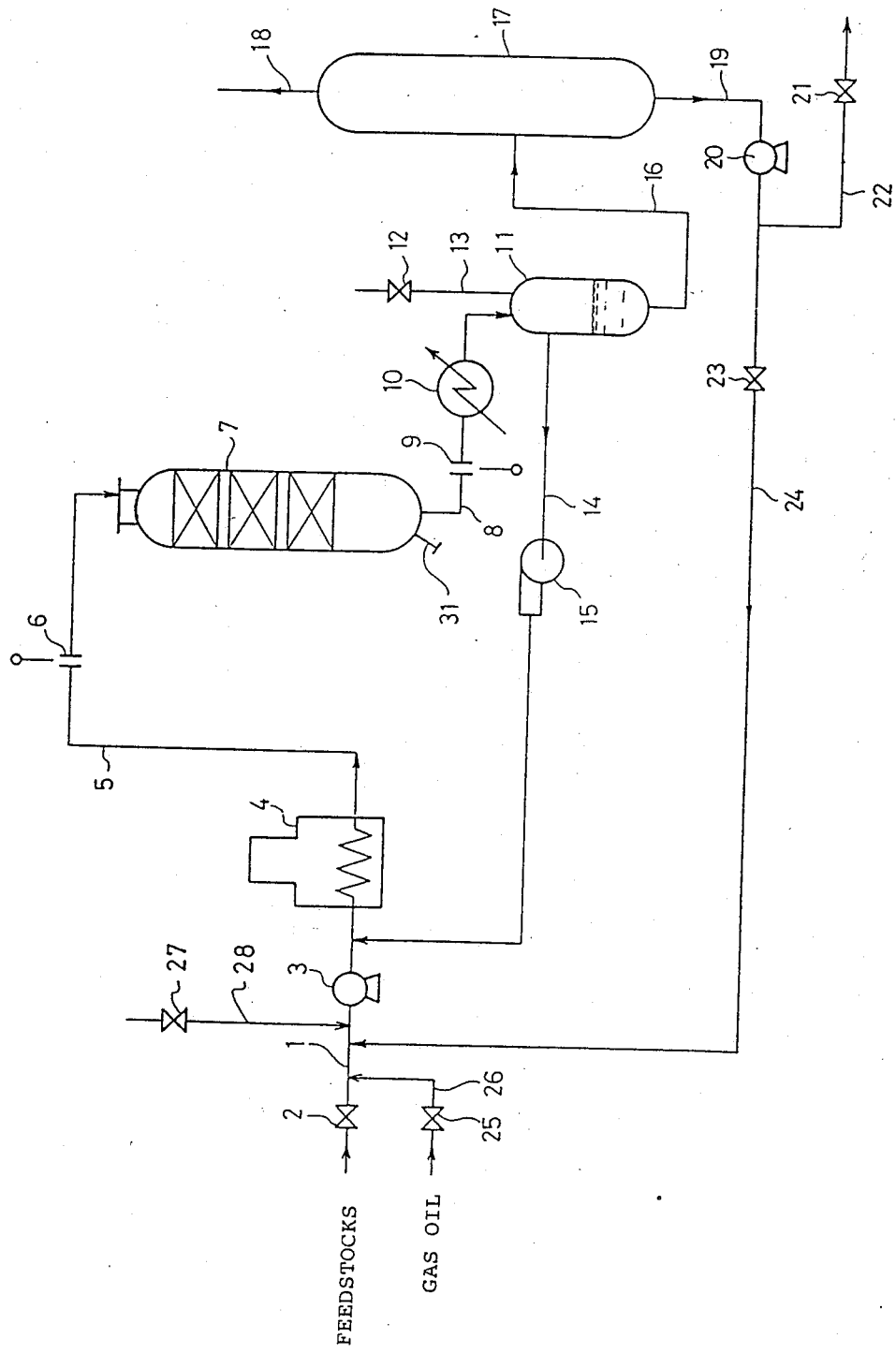
FIG. 1 is a flow diagram showing an example of the chemical plant where the method of the present invention is applied.

FIG. 1 shows the flow diagram of the chemical plant according to this embodiment. Referring to this drawing, the chemical plant includes an on-off valve 2 and a pump 3 provided on an intermediate portion of a feed pipeline 1 for feeding feedstocks, such as fuel oil, to a heating furnace 4 provided on the discharge side of this pump 3, in which heating the feedstock to a predetermined temperature can be effected. Provided on the intermediate portion of an outlet pipeline 5 from this heating furnace 4 is a flange 6 capable of separating the upstream side from the downstream side by inserting a blind plate. The forward end of this outlet pipeline 5 is connected to a reactor 7 packed or filled up with a suitable catalyst for example, for hydrodesulfurizing and the like. Provided on the intermediate portion of a bottom pipeline 8 of this reactor is another flange 9, into which a blind plate can be inserted as described above, and a cooler 10. The forward end of the bottom pipeline 8 is connected to the top portion of a separator 11. Connected to the top portion of the separator 11 is a flare pipeline 13 provided on the intermediate portion thereof with an on-off valve 12, and connected to a gaseous phase section of the separator 11 is a gas circulating pipeline 14. Provided on the intermediate portion of this gas circulating pipeline 14 is a blower at, and the forward end of the gas circulating pipeline 14 is connected to the feed pipeline 1 at a position betwen the pump 3 and the heating furnace 4. Normally, hydrogen gas flows through this gas circulating pipeline 14 during operation of the plant.

A liquid draw off pipeline 16 of the separator 11 is connected to the central portion of a distilling column 17, which is provided with a column top pipeline 18 and a column bottom liquid draw off pipeline 19. Provided on the intermediate portion of this column bottom liquid draw off pipeline 19 is a pump 20, the pipeline being bifurcated at the discharge side of the pump 10 into two branches with one of the branches being a column bottom subsequent process supply pipeline 22 provided on the intermediate portion thereof with an on-off valve 21 and the other of the branches being a column bottom liquid circulating pipeline 24 provided on the intermediate portion thereof with an on-off valve 23. The forward end of this column bottom liquid circulating piping 24 is connected to the feed pipeline 1 at a position between the on-off valve 2 and the pump 3.

A gas oil supply pipeline 26 provided on the intermediate portion thereof with an on-off valve 25 is connected to the feed pipeline 1 at a position upstream of a portion, at which the feed pipeline 1 is connected to the column bottom liquid circulating piping 24, and downstream of the on-off valve 2, whereby gas oils such as straight-run heavy gas oil (HGO), vacuum gas oil (VGO), and the like, is supplied through this gas oil supply pipeline 26.

Connected to the feed pipeline 1 at a position downstream of the portion, at which the feed pipeline 1 is connected to the column liquid circulating pipeline 24, is a pipeline 28 having an on-off valve 27, for supplying the condensed ring aromatic hydrocarbon. A condensed ring aromatic hydrocarbon including less than 0.005 weight percent organic amine should be used. This condensed ring aromatic hydrocarbon may be a light aromatic oil or a heavy aromatic oil including as the principal ingredient thereof 60% or more of naphthalenes such as alkylnaphthalene, anthracenes such as alkylanthracene, or pyrenes such as alkylpyrene, each of which has 2 to 4 ring members. More specifically, the condensed ring aromatic hydrocarbon is selected from the group of condensed ring aromatic hydrocarbons including light aromatic oils and heavy aromatic oils having 2 to 4 ring members. The mixing ratio of the condensed ring aromatic hydrocarbon to gas oil is 1.0 weight percent or more and preferably 1.0 to 5 weight percent.

These condensed ring aromatic hydrocarbons are relatively high in change of viscosity due to temperature, with the viscosity being low at high temperature and gradually increased as the temperature is lowered.

Figure 2:
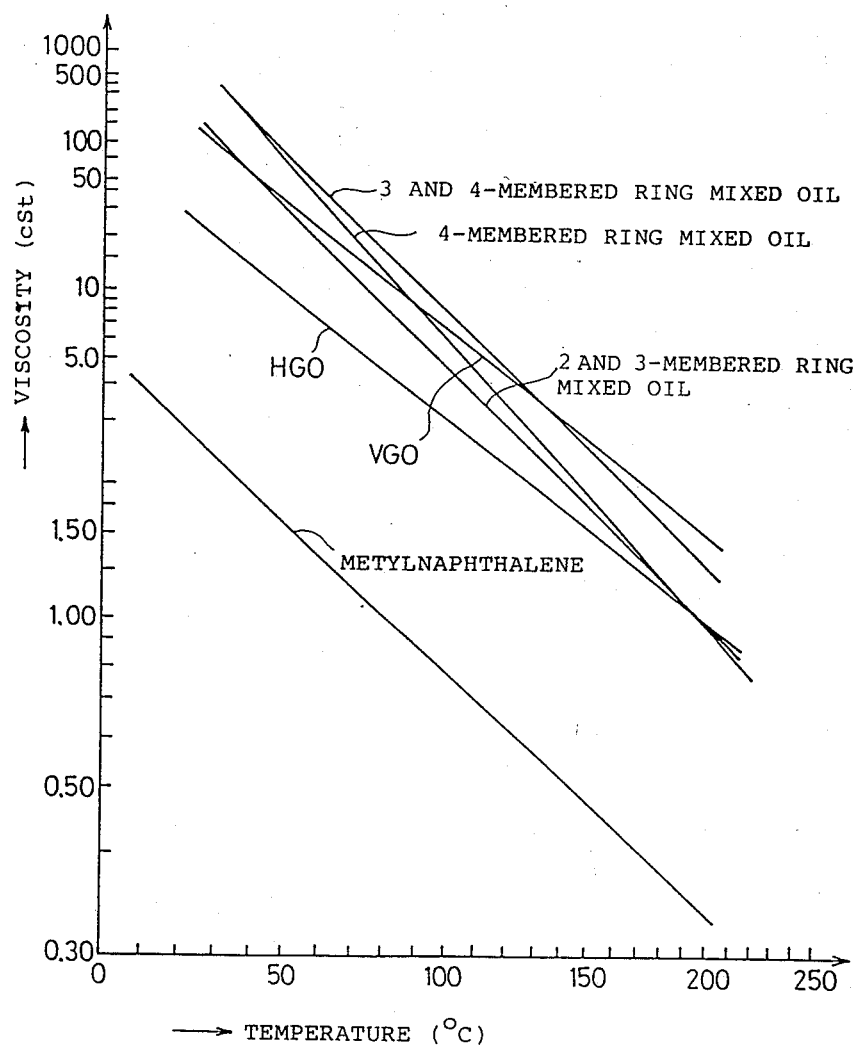
FIG. 2 is a chart showing changes in viscosity relative to the change in temperature of gas oil and the condensed ring aromatic hydrocarbon.

FIG. 2 shows the interrelations between the temperature and viscosity with regard to VGO, HGO, methylnaphthalene, two and three-membered ring mixed oil, three and four-membered ring mixed oil and four-membered ring mixed oil. Gradients B of the respective liquids in this drawing are evaluated through the following equation of calculation defined in ASTM D341.

$$\log Z = A - B \log T$$

where Z is viscosity, A and B are contants and T is temperature.

According to this equation, the gradients B of VGO and HGO are evaluated at about 3.85 from the empirical data thereof. The gradients B of the methylenaphthalene, the two and three-membered ring mixed oil, the three and four-membered ring mixed oil and the four-membered ring mixed oil are evaluated at 4.7 or more. It is evident that these changes in viscosity are larger in value than those of VGO and HGO as shown in the following table.

TABLE

| LIQUID | TEMPERATURE | |
|---|---|---|
| | 50° C. | 180° C. |
| VGO | 34.09 | 1.90 |
| | (cSt) | (cSt) |
| HGO | 9.907 | 1.17 |
| 2 and 3-membered ring mixed oil | 28.94 | 1.21 |
| 3 and 4-membered ring mixed oil | 81.94 | 1.65 |
| 4-membered ring mixed oil | 66.20 | 1.24 |
| methylnaphthalene | 1.576 | 0.38 |

The method of unloading a catalyst in the plant of this embodiment will hereunder be described.

When effecting to unload the catalyst, the heating temperature of the heating furnace 4 is lowered, whereby the temperature in the reactor 7 is gradually lowered to about 300° C. Subsequently, the on-off valve 2 of the feed pipeline 1 is closed and the on-off valve 25 of the gas oil supply pipeline 26 is opened, whereby the feedstock is changed over to gas oil such as HGO, VGO or the like. After this change-over to gas oil, recycle operation of the whole system is effected. More specifically, the on-off valve 21 of the column bottom liquid subsequent process pipeline 22 connected to the column bottom liquid draw off pipeline 19 of the distillation column 17 is closed and the on-off valve 23 of the column bottom liquid circulating pipeline 24 is opened, whereby the liquid drawn off from the column bottom liquid draw off pipeline 19 is returned to the feed pipeline 1 through the column bottom liquid circulating pipeline 24. This recycle operation is continued until the temperature in the reactor 7 reaches about 180° C. When the temperature in the reactor 7 reaches 180° C., the on-off valve 27 of the condensed ring aromatic hydrocarbon supply pipeline 28 is opened to supply the condensed ring aromatic hydrocarbon such as the two or three-membered ring mixed oil. The value of supply thereof is 1 to 5 weight percent to gas oil.

Upon completion of supplying the condensed ring aromatic hydrocarbon, the recycle operation is continued for an additional eight hours. After completion of the recycle operation, there is performed a so-called oil purge, i.e. removal of surplus gas oil which is present in the heating furnace 4, the outlet pipeline 5, the reactor 7 and the bottom pipeline 8 by recycling hydrogen gas flowing through the gas circulating pipeline 14, following which the heating furnace 4 is shut down to lower the temperature in the reactor 7 to 50° or less. Thereafter, the on-off valve 12 of the flare pipeline 13 is opened to discharge the hydrogen gas in the system, the hydrogen gas in the system is replaced with inert gas (normally, nitrogen gas), and pressure in the system is lowered to a value close to atmospheric pressure. When the pressure in the system reaches a value close to atmospheric pressure, the blind plates are inserted into the flanges 6 and 9 formed on the outlet pipeline 5 and the bottom pipeline 8, which pipelines are provided at positions upstream and downstream of the reactor 7, respectively, whereby the the reactor 7 is isolated.

Subsequently, an opening of a catalyst unloading nozzle 31 provided at the bottom portion of the reactor 7 is opened to unload the catalyst present in the reactor. In this case, the surfaces of the catalyst thus unloaded were completely coated by the viscous mixed liquid of the gas oil and the condensed ring aromatic hydrocarbon, so that oxidation of the catalyst which would otherwise tend to occur along with attendant heat was avoided and poisoning of the catalyst was not detected.

The present invention as described above can offer the advantage of providing a method of unloading a catalyst, wherein the catalyst can be prevented from being oxidized, poisoning of the catalyst can be avoided and catalyst unloading work can be safely and efficiently performed.

What is claimed is:

1. A method of enhancing the unloadability of a catalyst in a reactor, including reducing the possibility of combustion thereof during unloading, comprising treating said catalyst, during a halt in reactor operation and at a temperature higher than the temperature of the catalyst at which it will be unloaded from said reactor, with a mixture of (a) gas oil and (b) added condensed-ring aromatic hydrocarbons having 2 condensed rings, 3 condensed rings or 4 condensed rings or a mixture of said condensed-ring hydrocarbons, said component (b) being present in said liquid mixture in an amount whereby the increase in viscosity of said liquid mixture as a function of lowered temperature is greater than the increase in viscosity of said gas oil as a function of lowered temperature, whereby said liquid mixture pervades outer surfaces and pores of said catalyst, and whereby a film of said liquid mixture is formed as a coating on said catalyst at said temperature thereof at which it will be unloaded.

2. A process of claim 1, wherein said component (b) does not contain more than 0.005 wt.% of organic amines.

3. A method of treating a catalyst as set forth in claim 2, wherein the temperature of the catalyst in the reactor during said halt in operation of said reactor is reduced to about 150°–200° C. and the temperature of the catalyst in the reactor during unloading of said catalyst is less than about 70° C.

4. A process of claim 2, further comprising unloading said catalyst from said reactor at said unloading temperature.

5. A method of claim 2, wherein the functional dependence of said high change in viscosity as a function of temperature of said condensed ring aromatic hydrocarbon satisfies the form of the following equation defined by ASTM D341, $$\log \log Z = A - B \log T$$

where Z is viscosity, A and B are constants characterizing said functional dependence and T is temperature, provided that the constant B is 4.0 or more.

6. A method of claim 2, wherein the temperature of the catalyst in the reactor during said halt in operation of said reactor is reduced to about 180° C. and the temperature of the catalyst in the reactor during unloading of said catalyst is less than about 50° C.

7. A method of claim 2, wherein said gas oil is vacuum gas oil.

8. The method of claim 2, wherein said gas oil is straight-run heavy gas oil.

9. A method in accordance with claim 2, wherein said condensed-ring aromatic hydrocarbon is a naphthlene, anthracene or pyrene, or a mixture thereof.

10. A method in accordance with claim 9, wherein said condensed-ring aromatic hydrocarbon is in the form of a light or heavy aromatic oil comprising at least about 60% of said condensed-ring aromatic hydrocarbon.

11. The method as defined by claim 9, wherein said naphthalene is alkyl naphthalene.

12. The method as defined by claim 9, wherein said anthracene is alkyl anthracene.

13. The method as defined by claim 9, wherein said pyrene is alkyl pyrene.

14. The method as defined by claim 2, wherein the amount of said condensed-ring aromatic hydrocarbon in said liquid mixture is greater than 1 wt.% of the amount of said gas oil.

15. The method of claim 2, wherein the amount of said condensed-ring aromatic hydrocarbon in said liquid mixture is about 1 to about 5 wt.% of the amount of said gas oil.

16. A method of enhancing the unloadability of a catalyst in a reactor including reducing the possibility of combustion thereof during unloading, comprising treating said catalyst, during a halt in reactor operation and at a temperature higher than the temperature of the catalyst at which it will be unloaded from said reactor, with a liquid mixture of (a) gas oil and (b) added condensed-ring aromatic hydrocarbons exhibiting a functional dependence of viscosity change as a function of temperature of said condensed ring aromatic hydrocarbons which satisifies the form of the following equation defined by ASTM D341, $$\log Z + A = B \log T$$

where Z is viscosity, A and B are constants characterizing said functional dependence and T is temperature and the constant B is 4.0 or more, said component (b) being present in an amount whereby the increase in viscosity of said liquid mixture as a function of lowered temperature is greater than the increase in viscosity of said gas oil as a function of lowered temperature, whereby said liquid mixture pervades outer surfaces and pores of said catalyst, and whereby a film of said liquid mixture is formed as a coating on said catalyst at said temperature thereof at which it will be unloaded.

* * * * *